(12) United States Patent
Tanizaki et al.

(10) Patent No.: US 7,848,081 B2
(45) Date of Patent: Dec. 7, 2010

(54) LITHIUM-ION CAPACITOR

(75) Inventors: Hiroaki Tanizaki, Tokyo (JP); Nobuo Ando, Tokyo (JP); Yukinori Hatou, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 441 days.

(21) Appl. No.: 11/874,338

(22) Filed: Oct. 18, 2007

(65) Prior Publication Data
US 2008/0094778 A1    Apr. 24, 2008

(30) Foreign Application Priority Data
Oct. 20, 2006   (JP) ............................ 2006-286051

(51) Int. Cl.
*H01G 9/02* (2006.01)
(52) U.S. Cl. .................... 361/525; 361/502; 361/504; 361/512; 361/523; 361/528
(58) Field of Classification Search .............. 361/525, 361/523, 528–529, 502–504, 509–512, 516–519; 429/231.8, 217
See application file for complete search history.

(56) References Cited

U.S. PATENT DOCUMENTS

| | | | |
|---|---|---|---|
| 5,753,387 A * | 5/1998 | Takami et al. ............... 429/332 |
| 6,038,123 A * | 3/2000 | Shimodaira et al. ......... 361/502 |
| 6,461,769 B1 * | 10/2002 | Ando et al. ............ 429/231.95 |
| 6,576,369 B1 * | 6/2003 | Moriguchi et al. ....... 429/231.8 |
| 6,669,860 B1 * | 12/2003 | Maruyama et al. ......... 252/62.2 |
| 6,781,817 B2 * | 8/2004 | Andelman ................... 361/503 |
| 6,862,168 B2 | 3/2005 | Ando et al. |
| 7,052,803 B2 * | 5/2006 | Kato et al. ................ 429/231.8 |
| 2005/0142440 A1 * | 6/2005 | Yamaki et al. ............... 429/209 |

FOREIGN PATENT DOCUMENTS

| | | |
|---|---|---|
| JP | 06-52860 A | 2/1994 |
| JP | 08-31420 A | 2/1996 |
| JP | 10-226506 A | 8/1998 |
| JP | 2005-203130 A | 7/2005 |
| WO | 03/003395 A1 | 1/2003 |

* cited by examiner

*Primary Examiner*—Nguyen T Ha
(74) *Attorney, Agent, or Firm*—McDermott Will & Emery LLP (57) ABSTRACT

The invention provides a negative electrode material for use with a lithium-ion capacitor, which is high in energy density, output density and excellent in durability. When graphite of which an average distance between 002 lattice planes thereof is within a range from 0.335 nm to 0.337 nm is used for an active material of a negative electrode of a lithium-ion capacitor, the energy density of the capacitor is increased. The output characteristic and the cycle durability can be improved when $D_{10}$, $D_{50}$ and $D_{90}$ are set within predetermined ranges.

6 Claims, 6 Drawing Sheets

| | KS4 wt.% | KS6 wt.% | KS15 wt.% | KS25 wt.% | d002 nm | REQUIRED DOPING AMOUNT mAh/g | $D_{10}$ μm | $D_{50}$ μm | $D_{90}$ μm | $D_{90}-D_{10}$ μm |
|---|---|---|---|---|---|---|---|---|---|---|
| EXAMPLE 1 | 0 | 100 | 0 | 0 | 0.3358 | 400 | 1.6 | 3.4 | 6.5 | 4.9 |
| EXAMPLE 2 | 50 | 50 | 0 | 0 | 0.3356 | 420 | 1.4 | 2.9 | 5.6 | 4.2 |
| EXAMPLE 3 | 100 | 0 | 0 | 0 | 0.3356 | 440 | 1.2 | 2.4 | 4.7 | 3.5 |
| EXAMPLE 4 | 90 | 0 | 10 | 0 | 0.3357 | 430 | 1.4 | 3.0 | 6.0 | 4.6 |
| EXAMPLE 5 | 85 | 0 | 0 | 15 | 0.3358 | 410 | 1.5 | 3.7 | 8.1 | 6.5 |
| EXAMPLE 6 | 0 | 90 | 10 | 0 | 0.3358 | 400 | 1.8 | 3.9 | 7.6 | 5.8 |
| COMPARATIVE EXAMPLE 1 | 0 | 80 | 20 | 0 | 0.3358 | 390 | 1.9 | 4.3 | 8.6 | 6.7 |
| COMPARATIVE EXAMPLE 2 | 70 | 0 | 30 | 0 | 0.3356 | 410 | 1.8 | 4.1 | 8.5 | 6.7 |
| COMPARATIVE EXAMPLE 3 | 80 | 0 | 5 | 15 | 0.3357 | 410 | 1.6 | 3.9 | 8.7 | 7.1 |
| COMPARATIVE EXAMPLE 4 | 70 | 0 | 0 | 30 | 0.3358 | 410 | 1.9 | 5.0 | 11.5 | 9.6 |
| COMPARATIVE EXAMPLE 5 | 0 | 60 | 10 | 30 | 0.3358 | 390 | 2.3 | 6.1 | 13.8 | 11.5 |
| COMPARATIVE EXAMPLE 6 | 0 | 0 | 100 | 0 | 0.3358 | 380 | 3.1 | 8.0 | 17.2 | 14.1 |
| COMPARATIVE EXAMPLE 7 | 0 | 0 | 0 | 100 | 0.3358 | 370 | 3.5 | 11.0 | 27.2 | 23.7 |
| COMPARATIVE EXAMPLE 8 | 0 | 0 | 0 | 0 | LARGER THAN 0.337 | 420 | 2.0 | 3.8 | 6.9 | 4.9 |

FIG. 4

|  | LOW RATE DISCHARGING CAPACITY mAh | HIGH RATE DISCHARGING CAPACITY mAh | RATE CHARACTERISTIC % | CYCLE DURABILITY % |
|---|---|---|---|---|
| EXAMPLE 1 | 16 | 8.5 | 53.4 | 98 |
| EXAMPLE 2 | 16 | 8.7 | 54.4 | 98 |
| EXAMPLE 3 | 16 | 9.0 | 56 | 98 |
| EXAMPLE 4 | 16 | 8.7 | 54.6 | 98 |
| EXAMPLE 5 | 16 | 8.5 | 53.2 | 95 |
| EXAMPLE 6 | 16 | 8.5 | 53 | 97 |
| COMPARATIVE EXAMPLE 1 | 16 | 7.4 | 46 | 96 |
| COMPARATIVE EXAMPLE 2 | 16 | 7.8 | 49 | 94 |
| COMPARATIVE EXAMPLE 3 | 16 | 8.3 | 52 | 89 |
| COMPARATIVE EXAMPLE 4 | 16 | 6.8 | 42.4 | 78 |
| COMPARATIVE EXAMPLE 5 | 16 | 5.2 | 32.8 | 75 |
| COMPARATIVE EXAMPLE 6 | 16 | 3.5 | 21.8 | 60 |
| COMPARATIVE EXAMPLE 7 | 16 | 1.7 | 10.8 | 20 |
| COMPARATIVE EXAMPLE 8 | 13 | 7.2 | 55 | 98 |

LITHIUM-ION CAPACITOR

CROSS-REFERENCE TO RELATED APPLICATIONS

The disclosure of Japanese Patent Application No. 2006-286051 filed on Oct. 20, 2006 including the specification, drawings and abstract is incorporated herein by reference in its entirety.

BACKGROUND OF THE INVENTION

1. Field of the Invention

The present invention relates to a technology of a lithium-ion capacitor, and more particularly, to a technology which is well adaptable to a negative electrode material of a lithium-ion capacitor.

2. Description of the Related Art

The following technologies were investigated by the inventor of the present patent application and are briefly referred to below.

In the recent situation where the environmental issue, particularly the vehicle-exhaust gas emission, is widely talked about, efforts are made of developing environment-friendly electric vehicles and the like. In the electric vehicle development, the strong development effort is focused on the electricity storage device to be used as a power source. Many types of electricity storage devices have been proposed for replacement of the conventional lead battery, and the papers discussing electrolytes, electrode materials and the like are increasing in number.

JP-A-2005-203130, for example, discloses a technology to lessen the deterioration of the input and output characteristics at the time of charging and discharging by using a graphite material of which an average particle size is within a range from 3 to 15 μm for a negative electrode material of a lithium-ion secondary battery.

JP-A-10-226506 describes that, for example, the cycle life and the charging and discharging efficiency of the battery are improved by using graphite powder of which an average particle size $D_{50}$ by weight is 5 to 35 μm, which is obtained by the laser analysis scattering method with a maximum particle size of 75 μm, for a negative electrode material of a lithium secondary battery.

JP-A-06-52860 discloses a technology which suppresses the self-discharge, which results from a reaction of graphite with an electrolyte, to practically negligible levels in such a manner that graphite powder having a particle size of less than 10 μm is not used as a negative electrode material which can absorb and desorb lithium in a lithium secondary battery.

JP-A-08-31420 discloses that in a lithium battery, its mixing property with a binder at the time of electrode formation and decomposition of an electrolyte on the electrode surface can be suppressed in such a manner that a particle size of mesophase small spheres (meso carbon micro beads), which are produced through heat treatment of pitches, is specified by $D_{10}$, $D_{50}$ and $D_{90}$.

The lithium-ion secondary battery or the like is advantageous in that it has high energy density, but has still technical problems. For example, its safety is still uncertain and its cycle life is not long. To cope with this, there has proposed an electric double layer capacitor as a novel electricity storage device. The electric double layer capacitor has a smaller discharging capacity per charge than that of a battery, but it is excellent in instantaneous charging/discharging characteristic and has such excellent output characteristics that it endures several tens of thousands cycles of charging/discharging operations.

Particularly, as disclosed in International Publication WO2003/003395, a novel lithium-ion capacitor is attracting attention in those fields. In the lithium-ion capacitor, a negative electrode is pre-doped with lithium ions to thereby keep a potential of the negative electrode low, and to secure the safety comparable with that of the electric double layer capacitor, high output characteristics, and high energy density.

As described above, various types of next generation electricity storage devices, which will come after the lead battery, have been proposed. However, the technologies of those proposed ones still involve many problems to be solved.

The lithium-ion capacitor in which the inventor has engaged for its development is also still unsatisfactory in energy density, output density, cycle durability and the like.

SUMMARY OF THE INVENTION

The inventor has estimated that the energy density and the like can be improved by selecting an appropriate material for a negative electrode active material, as in a case of the lithium-ion secondary battery, etc.

Accordingly, an object of the present invention is to provide a negative electrode material for a lithium-ion capacitor, which is high in energy density, output density and durability.

Other objects, advantages and features of the invention will be apparent when carefully reading the description to follow and the accompanying drawings.

In summary, a negative electrode active material for a lithium-ion capacitor is made of graphite having certain diameters.

The useful effects produced by the invention will be briefly described below.

Use of the graphite having a predetermined diameter for the negative electrode active material of the lithium-ion capacitor improves the energy density, the output density and the cycle durability at the time of charging and discharging.

DESCRIPTION OF THE PREFERRED EMBODIMENTS

An embodiment of the present invention will be described with reference to the accompanying drawings.

A lithium-ion capacitor of the invention includes a positive electrode, a negative electrode and an electrolyte. In the embodiment, an aprotic organic solution containing a lithium salt is used as the electrolyte.

A material which allows lithium ions and/or anions to be reversibly doped thereinto and de-doped therefrom is used for a positive electrode active material. A material which allows lithium ions to be reversibly doped thereinto and de-doped therefrom is used for a negative electrode active material.

In the specification of the present patent application, the term "dope" involves "occlude", "carry", "absorb" or "insert", and specifically a phenomenon where lithium ions and/or anions enter the positive electrode active material or lithium ions enter the negative electrode active material. The term "de-dope" involves "release" and "desorb", and specifically a phenomenon where lithium ions or anions desorb from the positive electrode active material or lithium ions desorb from the negative electrode active material.

The term "positive electrode" means an electrode from which current flows out when the lithium-ion capacitor is discharged, and the term "negative electrode" means an electrode to which current flows when the lithium-ion capacitor is discharged.

A potential of the positive electrode and that of the negative electrode after those electrodes are shortcircuited are preferably 2 V (vs. Li/Li$^+$) or lower, for example. More specifically, in the lithium-ion capacitor of the invention, it is preferable to dope the negative electrode and/or the positive electrode with lithium ions so that after the positive electrode and the negative electrode are shortcircuited, the potential of the positive electrode is 2 V (vs. Li/Li$^+$) or lower, for example.

In the case of the capacitor having not been doped with lithium ions, unlike the construction mentioned above, the potentials of the positive electrode and the negative electrode are 3 V, and before the charging of the capacitor, the potential of the positive electrode is 3 V after shortcircuiting the positive electrode and the negative electrode. As in the invention, the doping of lithium ions lowers the electrode potential to be 3 V (vs. Li/Li$^+$) or lower, preferably 2 V (Li/Li$^+$) or lower to improve the capacity.

In the specification, the wording "the potential of the positive electrode after shortcircuiting between the positive electrode and the negative electrode is 2 V (vs. Li/Li$^+$) or lower" means that the potential of the positive electrode, which is obtained by either of the following methods, is 2 V (vs. Li/Li$^+$) or lower.

The first method is as follows. After the doping of lithium ions, a positive electrode terminal and a negative electrode terminal of a capacitor cell (to be referred frequently to as a cell) of the lithium-ion capacitor are directly connected by a conductor to be shortcircuited. This shortcircuiting state is left to stand for 12 hours or longer. Thereafter, the shortcircuiting state is canceled and the potential of the positive electrode is measured within a time range from 0.5 to 1.5 hours.

The second method is as follows. By using a charging/discharging apparatus, the capacitor is discharged to 0 V at a constant current for 12 hours or longer. Then, the positive electrode terminal and the negative electrode terminal are coupled together by means of a conductor to be shortcircuited. In this state, the capacitor is left to stand for 12 hours or longer and the shortcircuiting of those electrodes is canceled. The potential of the positive electrode is measured within a time range from 0.5 to 1.5 hours.

Generally, the upper limit of the charging voltage is determined by such a voltage as not to cause the decomposition of the electrolyte owing to increase of the positive electrode potential. When the positive electrode potential is set at the upper limit, the charging voltage may be increased by decrease of the negative electrode potential. If the potential of the positive electrode after shortcircuiting is lowered to be 3 V (vs. Li/Li$^+$) or lower, preferably 2 V (vs. Li/Li$^+$) or lower, the utilized capacity of the positive electrode increases by the potential decrease and the capacity of the capacitor becomes high.

In a so-called hybrid capacitor, activated carbon is used for a positive electrode and graphite or hard carbon, which is used in a lithium-ion secondary battery, is used for a negative electrode. In such a hybrid capacitor, the activated carbon or the carbon material has usually a potential at 3 V (vs. Li/Li$^+$) or there around. Therefore, even if the terminals of the positive electrode and the negative electrode are shortcircuited, the potentials at about 3 V (vs. Li/Li$^+$) of those electrodes remain unchanged.

On the basis of those facts, in the lithium-ion capacitor of the invention, the potential of the positive electrode is lowered to 2 V (vs. Li/Li$^+$) or lower when the electrodes are shortcircuited by doping the negative electrode with lithium ions, which are supplied from a lithium ion source, e.g., metal lithium, which is separately provided.

This means the negative electrode and/or the positive electrode of the cell of the lithium-ion capacitor is doped, in advance, with lithium ions supplied from the lithium ion source.

With the pre-doping of the lithium ions, the potential of the positive electrode is lowered to be 2 V (vs. Li/Li$^+$) or lower after the positive electrode and the negative electrode are shortcircuited.

In the invention, one or both of the negative electrode and the positive electrode may be doped with the lithium ions. In this case, when the potential of the positive electrode is excessively lowered by increasing the doping amount of lithium ions, problems sometimes arise. For example, the lithium ions are irreversibly consumed and the cell capacity lowers. Accordingly, it is necessary to control the doping amounts of lithium ions at the negative electrode and the positive electrode so as not cause such a problem. The controlling of the doping amounts of the lithium ions at the electrodes makes the cell forming process complicated. To avoid this, the lithium ions are preferably doped only into the negative electrode.

In constructing the lithium-ion capacitor of the invention, it is preferable that the capacitance of the negative electrode per unit weight is not less than three times as large as the capacitance of the positive electrode per unit weight. Further, it is preferable that the weight of the positive electrode active material is larger than that of the negative electrode active material. By so selecting the capacitance and the weight, the lithium-ion capacitor of high voltage and high capacity is obtained.

As just mentioned, it is preferable that the weight of the positive electrode active material is larger than that of the negative electrode active material. Preferably, the former is 1.1 to 10 times as large as the latter. In the case of less than 1.1 times, the capacity difference is small. In the case of 10 times or larger, the cell capacity becomes sometimes small. Further, in this case, the thickness difference between the positive electrode and the negative electrode is too large. This is not desirable in the cell construction.

In the present invention, the capacitance and the capacity of the cell of the lithium-ion capacitor are defined as follows.

The capacitance of the cell indicates an amount of electricity which flows through the cell per unit voltage of the cell, i.e., a slope of the discharging curve, and its unit is F (farad). The capacitance of the cell per unit weight is obtained by dividing the capacitance of the cell by the sum of the weights of the positive electrode active material and the negative electrode active material, which are loaded in the cell, and the unit thereof is F/g.

The capacitance of the positive electrode or the negative electrode indicates an amount of electricity which flows through the cell per unit voltage of the positive electrode or the negative electrode, i.e., a slope of the discharging curve, and the unit thereof is F (farad). The capacitance of the positive electrode or the negative electrode per unit weight is obtained by dividing the capacitance of the positive electrode or the negative electrode by the weight of the positive electrode active material or the negative electrode active material, which is loaded in the cell, and the unit thereof is F/g.

The cell capacity is a product of a difference between the cell voltage at the time of starting the discharging operation and that at the time of ending the discharging operation, i.e., amount of voltage change, and a capacitance of the cell, and the unit of the cell capacity is C (coulomb). 1 C is a quantity of charge when current of 1 A flows for one second, and in the specification it is converted and expressed in terms of mAh in some cases.

The positive electrode capacity is a product of the capacitance of the positive electrode and a difference between the positive electrode potential at the time of starting the discharging operation and that at the time of ending the discharging operation (amount of change of the positive electrode potential), and the unit of the positive electrode capacity is C or mAh. The negative electrode capacity is a product of the capacitance of the negative electrode and a difference between the negative electrode potential at the time of starting the discharging operation and that at the time of ending the discharging operation (amount of change of the negative electrode potential), and the unit of the negative electrode capacity is C or mAh. The cell capacity, the positive electrode capacity and the negative electrode capacity are equal to one another.

In the lithium-ion capacitor of the invention, the negative electrode and/or the positive electrode is doped with lithium ions in advance. The doping method is not particularly limited.

A lithium ion source, such as metal lithium, which is capable of supplying lithium ions may be located as a lithium electrode within the capacitor cell. To dope the electrode, the lithium electrode is preferably brought into physical contact (shortcircuiting) or brought into contact by electrochemical means with the positive electrode and/or the negative electrode.

An amount of the lithium ion source (weight of metal lithium, for example) is sufficient if it produces a predetermined capacity of the negative electrode.

The lithium ion source may be formed on a lithium electrode current collector made of a conductive material having through holes. The conductive material having through holes may be a metal material with through holes, which does not react with the lithium ion source, for example, a stainless steel mesh.

In the case of the large capacity capacitor cell having a multi-layer structure, the positive electrode and the negative electrode are provided with a positive electrode current collector and a negative electrode current collector respectively for feeding and receiving electricity. In the cell thus structured, for example, the lithium electrode is located at a position where it faces the negative electrode, and lithium ions are electrochemically supplied to the negative electrode.

In this case, a substrate having through holes, i.e. holes passing through the substrate from the front to the reverse side of the substrate, such as an expanded metal, is preferably used for the positive electrode current collector and the negative electrode current collector, and a lithium electrode is located facing the negative electrode and/or the positive electrode.

The form, the number and the like of the through holes are not limited to specific ones in particular. The through holes may be formed such that lithium ions in an electrolyte are movable from one side to the other side of the electrode via the through holes without interruption of the electrode current collectors.

In the lithium-ion capacitor of the invention, the lithium ions can be uniformly doped even when the lithium electrode for doping the negative electrode and/or the positive electrode with lithium ions is locally located in the cell.

Accordingly, even in the large capacity cell of the type in which the positive electrode and the negative electrode are layered or wound, the negative electrode and/or the positive electrode may be smoothly and uniformly doped with the lithium ions by locating the lithium electrode at a part of the outermost peripheral or the outermost side of the cell.

Various kinds of materials that are widely proposed in the lithium battery may be used for forming the electrode current collectors. Aluminum, stainless steel or the like may be used for the positive electrode current collector, and stainless steel, copper, nickel or the like may be used for the negative electrode current collector.

When lithium ions are doped through the electrochemical contact of the electrode(s) with the lithium ion source located in the cell, the lithium ion source may be a material containing at least lithium elements and capable of supplying lithium ions, such as metal lithium or lithium-aluminum alloy.

In the lithium-ion capacitor of the invention, graphite is used for the negative electrode active material. The graphite is used of which an average distance between 002 lattice planes, i.e. d002, is within a range from 0.335 nm to 0.337 nm. There is no other prior art than the present invention in which such graphite is used for the negative electrode of the lithium-ion capacitor, so far as the present inventor knows.

The average distance d002 of the graphite as the negative electrode active material was measured by the powder X-ray diffraction equipment, RINT-UltimaIII (manufactured by Rigaku Corporation) according to the Gakushin method (Japan Society for the Promotion of Science, N. 117 Committee, Carbon 1963 (No. 36)). The inventor has found that the energy density of the lithium-ion capacitor can be increased by using the graphite as defined above for the negative electrode of the lithium-ion capacitor. This would be due to the fact that the charging and discharging capacity of the graphite material is high, 300 mAh/g to 372 mAh/g, and the potential for doping/de-doping the lithium ions is almost constant over a wide range of charge/discharge depth.

It has been also found that high output density is obtained by specifying the particle size distribution of the graphite. In other words, it has been found that the particle size distribution of the graphite of the negative electrode is important to obtain high output density.

In the invention, the high output density is obtained by selecting the particle size of the graphite to be smaller than that in the conventional case. It has been found that the average particle diameter of the graphite is selected such that $D_{50}$ is defined as $0<D_{50}\leq4.0$ μm. The $D_{50}$ value indicates the value at which 50% by volume of the particles in the measured sample have a particle diameter smaller than or equal to the value.

It has been also confirmed that when the graphite material as mentioned above is used, the charge transfer resistance little varies within a potential range where the potential is almost constant. With such a feature, stable outputting of electric power is ensured within a wide charging/discharging depth range. That is, it is possible to provide the lithium-ion capacitor capable of outputting stable and high electric power.

It has been also found that the durability of the lithium-ion capacitor is improved by narrowing the particle size distribution of the graphite. This fact would be due to the fact that if the particle size distribution is narrowed, a variation of the charge/discharge depths of the particles of the negative electrode material is lessened, and load applied to each particle of the active material is stabilized. As a result, the charging/discharging operation is stably performed even if the charging/discharging operation is repeated.

Specifically, the cycle durability was improved when a difference between the particle size of the graphite used for the negative electrode active material is placed within a range of $0 < (D_{90} - D_{10}) \leqq 7.0$ μm. The $D_{10}$ value and the $D_{90}$ value indicate the values at which 10% and 90% by volume of the particles in the measured sample have a particle diameter smaller than or equal to these values.

The particle size distribution of the graphite used for the negative electrode active material was measured in such a manner that the negative electrode active material was sufficiently dispersed into water by ultrasonication, and $D_{10}$, $D_{50}$ and $D_{90}$ were measured by using a laser diffraction particle size distribution measuring instrument (Microtrac, manufactured by Nikkiso Co., Ltd.).

The negative electrode in the invention, which is formed of the graphite powder as the negative electrode active material having the particle size property as mentioned above. An appropriate conventional process may be used for forming the negative electrode. In an example process, the negative electrode active material powder, a binder, and if necessary, a conductive material and a thickening agent (carboxymethyl cellulose (CMC), etc.) are dispersed into a water or an organic solvent to obtain a slurry. The slurry is coated over the current collector, or the slurry is molded into a sheet and the sheet is stuck onto the current collector.

Examples of the binder used when the negative electrode is formed include a rubber-based binder such as SBR; a fluorine contained resin such as polytetrafluoroethylene or polyvinylidene fluoride; a thermoplastic resin such as polypropylene or polyethylene; and an acrylic resin. A preferable amount of the binder to be added is 2 to 40% by weight of the negative electrode active material although it varies depending on an electric conductivity of the negative electrode active material, an electrode shape, and the like.

Examples of the conductive material, which is used if necessary, include an acetylene black and metal powder. A preferable amount of the conductive material to be added is 2 to 40% by weight of the negative electrode active material although it varies depending on an electric conductivity of the negative electrode active material, an electrode shape, and the like.

In the field of the conventional lithium-ion secondary battery, many prior arts which specify the particle size of the negative electrode active material have been presented as in the patent publications already referred to. In all of those arts, the lithium source depends on the positive electrode. In these cases, when the particle size of the negative electrode active material is within the range mentioned above, the irreversible capacity is large and an insufficient charging/discharging capacity is obtained. As a result, the resultant capacitor is almost impossible in practical use. This fact was confirmed.

In this connection, it is noted that in the lithium-ion capacitor of the invention the lithium ion source does not depend on the positive electrode, and that it is allowed to dope the extra amount of lithium ions corresponding to the irreversible capacity and the capacitor can be actually used with no lowering of the energy density.

In the lithium-ion capacitor of the invention, the positive electrode active material used for forming the positive electrode is not limited in particular as long as it is a material allowing lithium ions and anions such as tetrafluoroborate to be reversibly doped.

The positive electrode active material is preferably an activated carbon, a conductive polymer, a polyacene-based material, or the like. In the positive electrode active material, the particle size of the activated carbon, for example, may be selected from a variety of particle sizes, generally used. Its $D_{50}$ is 2 μm or larger, more preferably 2 to 50 μm, and particularly preferably 2 to 20 μm. The average pore size of the activated carbon is preferably 10 nm or smaller, and the specific surface area thereof is preferably 600 to 3000 m²/gm, particularly 1300 to 2500 m²/gm.

The positive electrode, which is formed of the positive electrode active material powder mentioned above, may be formed by an appropriate conventional forming process, as in the case of the negative electrode. In an example process, the positive electrode active material powder, a binder, and if necessary, a conductive material and a thickening agent (carboxymethyl cellulose (CMC), etc.) are dispersed into a water or an organic solvent to obtain a slurry. The slurry is coated over the current collector, or the slurry is molded into a sheet in advance and the sheet is stuck onto the current collector.

Examples of the available binder include a rubber-based binder such as SBR; a fluorine containing resin such as polytetrafluoroethylene or polyvinylidene fluoride; a thermoplastic resin such as polypropylene or polyethylene; and an acrylic resin.

A preferable amount of the binder material to be added is 2 to 40% by weight of the positive electrode active material although it varies depending on an electric conductivity of the positive electrode active material, an electrode shape, and the like. Examples of the conductive material, which is used if necessary, include an acetylene black, graphite, and metal powder. A preferable amount of the conductive material to be added is 2 to 40% by weight of the positive electrode active material although it varies depending on an electric conductivity of the positive electrode active material, an electrode shape, and the like.

In the lithium-ion capacitor of the invention, an aprotic organic solvent forming an aprotic organic solvent electrolyte may be used for the electrolyte. Examples of the aprotic organic solvent include ethylene carbonate, propylene carbonate, dimethyl carbonate, diethyl carbonate, γ-butyrolactone, acetonitrile, dimethoxyethane, tetrahydrofulan, dioxolan, methylene chloride, and sulfolane. In addition, a mixed solvent having at least two types of these aprotic organic solvents can be used.

An electrolyte to be dissolved in the single or mixed solvent may be any type of electrolytes as long as it is able to generate lithium ions. Examples of such type of electrolyte include $LiClO_4$, $LiAsF_6$, $LiBF_4$, $LiPF_6$, $LiN(C_2F_5SO_2)_2$, and $LiN(CF_3SO_2)_2$.

The electrolyte and the solvent, after sufficiently dehydrated, must be mixed into an electrolyte. A concentration of the electrolyte is preferably at least 0.1 mol/l, more preferably within a range from 0.5 to 1.5 mol/l, in order to reduce the internal resistance of the electrolyte.

The lithium-ion capacitor of the invention is suitable for a capacitor cell of a large capacity, such as a wound-type cylindrical cell in which strip-like positive and negative electrodes are wound with a separator interposed between them, a lamination-type prismatic cell in which plate-like positive and negative electrodes are laminated at least three layers with a separator interposed between them, and a film-type cell in which a lamination is sealed in an outer jacket film, the lamination being configured such that plate-like positive and negative electrodes are laminated at least three layers with a separator interposed between them.

Figure 1:
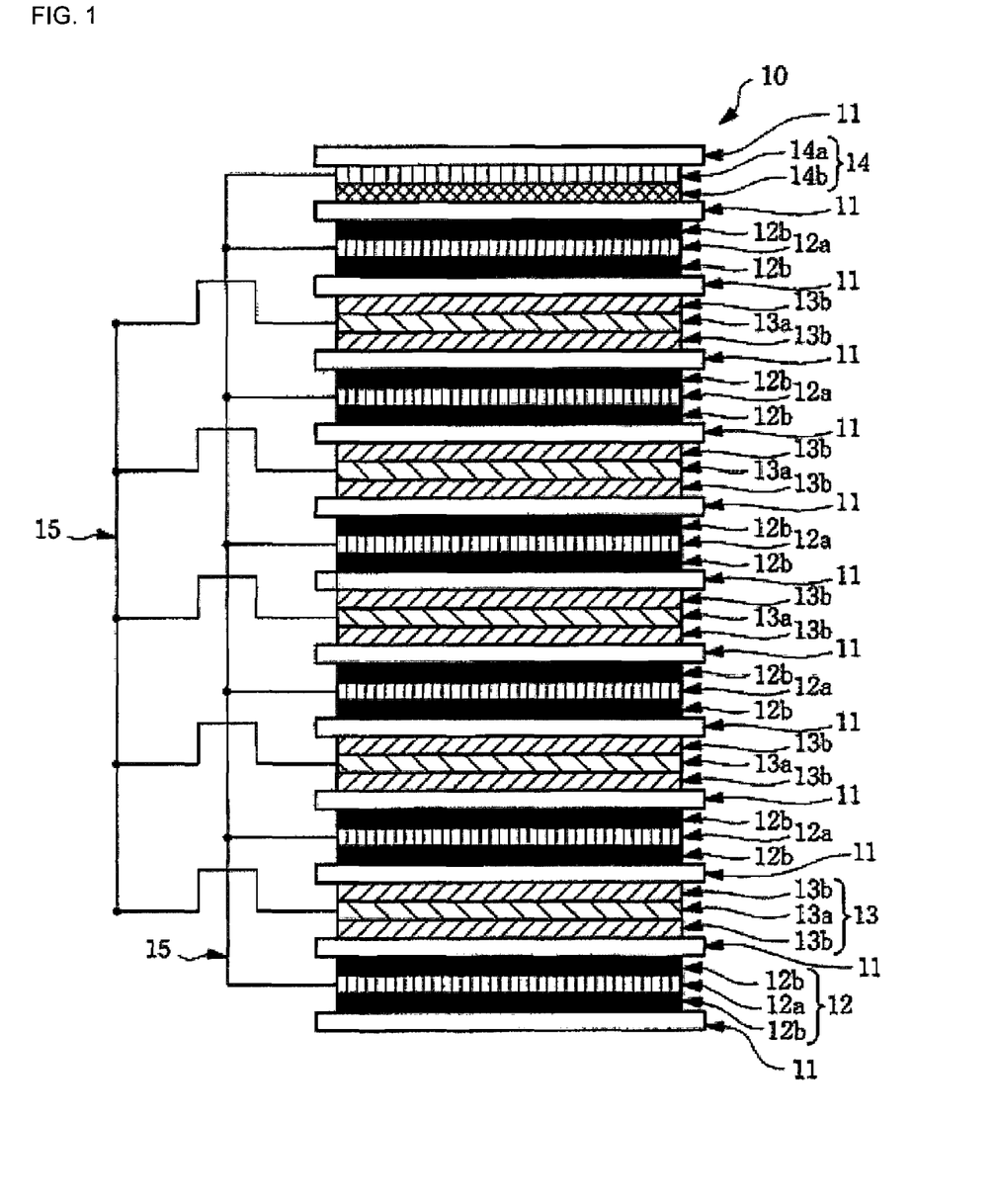
FIG. 1 is a schematic diagram showing a major portion of a lamination-type lithium-ion capacitor according to the present invention.

FIG. 1 shows, for example, a major portion of a lamination-type lithium-ion capacitor 10 is illustrated. In the lamination-type structure, as shown FIG. 1, negative electrodes 12 and positive electrodes 13 are alternately laminated in a state that a separator 11 is interposed between the negative electrode and the positive electrode, which are adjacent to each other. As shown in FIG. 1, a lithium electrode 14 is layered on the separator 11 located on the negative electrode 12 of the structure containing the negative electrodes 12 and the positive electrodes 13, which are alternately laminated. Another separator 11 is layered on the lithium electrode 14.

Each negative electrode 12 includes a negative-electrode current collector 12a and negative-electrode active material layers 12b on both surfaces of the negative-electrode current collector 12a. The negative-electrode active material layer 12b is formed by coating surfaces of the negative-electrode current collector 12a with a slurry of a negative electrode active material. The negative-electrode current collectors 12a of the negative electrodes 12 are connected in parallel by conductor wires 15.

Each positive electrode 13 also includes a positive-electrode current collector 13a and positive-electrode active material layers 13b on both surfaces of the positive-electrode current collector 13a. The positive-electrode active material layer 13b is also formed by coating a surface of the positive-electrode current collector 13a with a slurry of a positive electrode active material. The positive-electrode current collectors 13a of the positive electrodes 13 are also connected in parallel by conductor wires 15.

The lithium electrode 14, which is located on the separator 11 layered on the negative electrode 12 located in the upper part of the lamination structure including the negative electrodes 12 and the positive electrodes 13, includes a metal lithium 14b as a lithium ion source, which is layered on a surface of a lithium-electrode current collector 14a. The lithium-electrode current collector 14a, as shown in FIG. 1, is connected in parallel to the negative-electrode current collectors 12a by the conductor wires 15.

Figure 2:
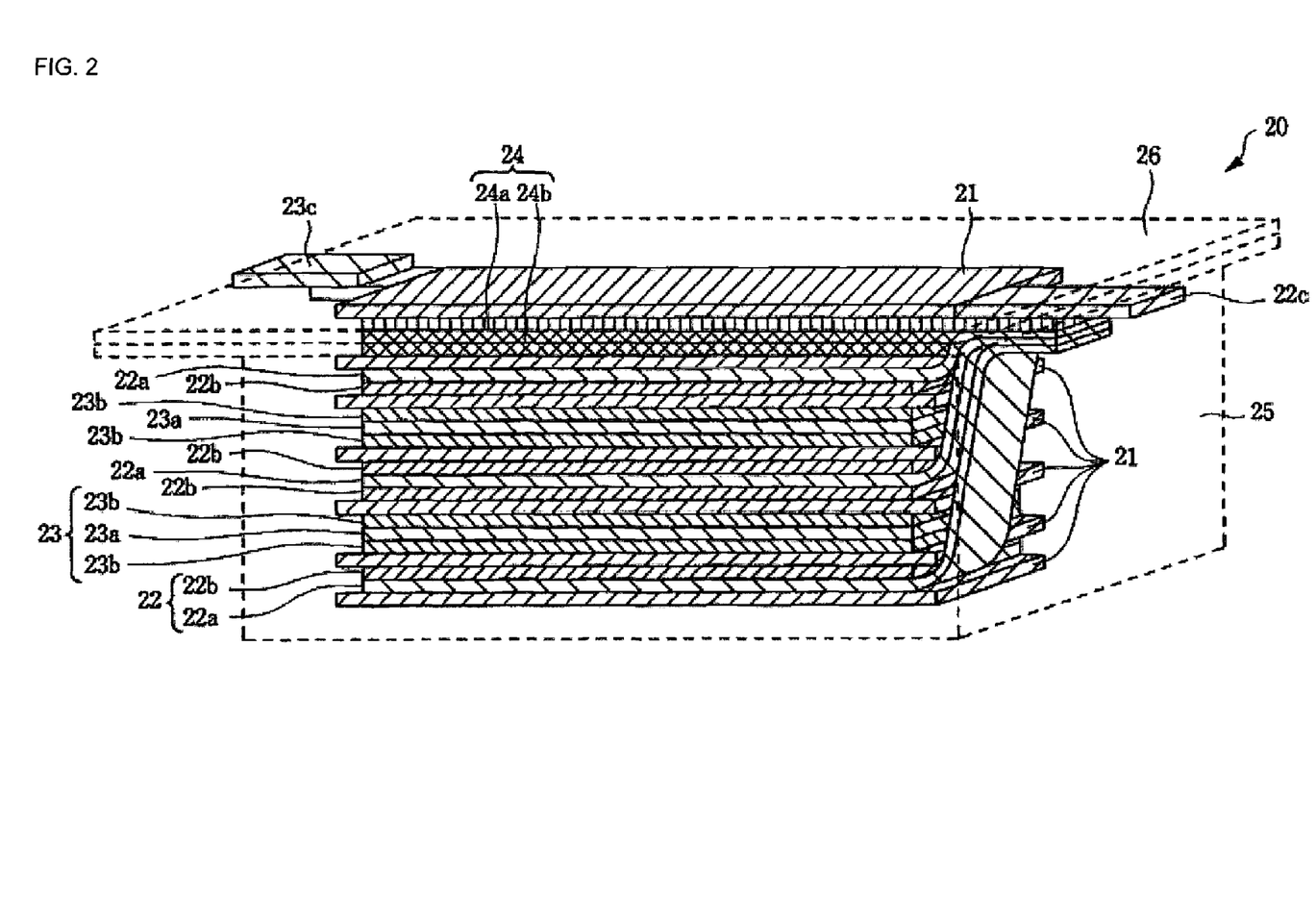
FIG. 2 is a schematic diagram showing a major portion of a laminate film-type lithium-ion capacitor according to the invention.

FIG. 2 shows a major portion of a film-type lithium-ion capacitor 20. In the structure of FIG. 2, negative electrodes 22 and positive electrodes 23 are alternately laminated in a state that a separator 21 is interposed between the negative electrode and the positive electrode, which are located adjacent to each other. A lithium electrode 24, as shown in FIG. 2, is provided on a separator 21 in the upper part of the structure including the negative electrodes 22 and the positive electrodes 23, which are alternately laminated. Another separator 21 is provided on the lithium electrode 24.

Each negative electrode 22 includes a negative-electrode current collector 22a and a negative-electrode active material layer 22b layered on the negative-electrode current collector 22a. The negative-electrode active material layer 22b is formed by coating surfaces of the negative-electrode current collector 22a with a slurry of a negative electrode active material. The negative-electrode current collectors 22a thus structured are provided with terminal connection parts, which are connected together and to a negative electrode terminal 22c.

Each positive electrode 23 also includes a positive-electrode current collector 23a and positive-electrode active material layers 23b on both surfaces of the positive-electrode current collector 23a. The positive-electrode active material layer 23b is also formed by coating surfaces of the positive-electrode current collector 23a with a slurry of a positive electrode active material. The positive-electrode current collectors 23a thus structured are provided with terminal connection parts, which are connected together and to a positive electrode terminal 23c, as shown in FIG. 2.

The lithium electrode 24, which is provided on the separator 21 in the upper part of the structure including the negative electrodes 22 and the positive electrodes 23, includes a metal lithium 24b as a lithium ion source, which is provided on a surface of the lithium-electrode current collector 24a. The lithium-electrode current collector 24a, as shown in FIG. 2, is connected together with the terminal connection parts of the negative-electrode current collectors 22a, and connected to a negative electrode terminal 22c.

The structure of the negative electrode 22, the positive electrode 23, and the lithium electrode 24, which are thus laminated, as shown in FIG. 2, is placed in a deep-drawn laminate film 25. The upper end of the lamination structure is sealed with a flat laminate film 26. The negative electrode terminal 22c and the positive electrode terminal 23c are extended outside through the sealing parts of the laminate films 25 and 26. In FIG. 2, the laminate films 25 and 26 are indicated by broken lines.

The cell structure is already described in WO00/07255, WO03/003395, JP-A-2004-266091, and others. The capacitor cell of the invention may take such a cell structure.

EXAMPLES

The lithium-ion capacitor thus constructed and the useful effects produced by the lithium-ion capacitor will be described in details by using examples of the lithium-ion capacitor. It should be understood that the present invention is not limited by the examples to be described.

Example 1

Method of Manufacturing Negative Electrode

Graphite KS6 (manufactured by TIMCAL Graphite & Carbon) was used for the graphite as the negative electrode active material. 88 parts by weight of the above graphite, 5 parts by weight of acetylene black, 3 parts by weight of styrene-butadiene rubber binder, 4 parts by weight of carboxymethyl cellulose, and 200 parts by weight of ion exchanged water were sufficiently mixed to obtain a slurry for the negative electrode.

The slurry was coated over a negative electrode current collector formed with a copper expanded metal (manufactured by Nippon Metal Industry Co., Ltd.) having a thickness of 32 μm (porosity of 57%). Both surfaces of the negative electrode current collector were coated with the slurry by using a roll coater. The negative electrode layer was thus formed and vacuum dried, to thereby obtain a negative electrode having a total thickness (the sum of the negative electrode layer thicknesses on both the surfaces of the current collector and the current collector thickness) of 79 μm.

An average distance between 002 lattice planes, i.e., d002, of the negative electrode active material was 0.3358 nm, and for the particle size distribution, $D_{10}=1.6$ μm, $D_{50}=3.4$ μm, and $(D_{90}-D_{10})=4.9$ μm.

(Method of Manufacturing Positive Electrode)

A slurry was obtained by thoroughly mixing 92 parts by weight of commercially available activated carbon powder having a specific surface area of 2000 m$^2$/g, 6 parts by weight of acetylene black powder, 7 parts by weight of an acrylic resin binder, 4 parts by weight of carboxymethyl cellulose, and 200 parts by weight of water. Both surfaces of an aluminum expanded metal (manufactured by Nippon Metal Industry Co., Ltd.) having a thickness of 38 μm (porosity of 47%) were coated with a non-aqueous carbon conductive coating by a roll coater, and dried to thereby obtain a current collector for the positive electrode having a conductive layer formed thereon. The total thickness (the sum of the current collector thickness and the conductive layer thickness) was 52 μm, and most of the throughholes of the positive electrode current collector were filled with the conductive coating.

The slurry of the positive electrode was coated over both surfaces of the positive electrode current collector by means of a roll coater to produce a positive electrode layer. The positive electrode layer was vacuum dried to obtain a positive electrode having a total thickness (the sum of the positive electrode layer thicknesses on both surfaces and the conductive layer thicknesses on both the surfaces, and the positive-electrode current collector thickness) of 182 μm.

(Measurement of Doping Amount of Lithium Ions)

A doping amount of lithium ions, which is necessary for measuring a capacitance of the negative electrode per unit weight, was measured. In the measurement, the capacitance of the negative electrode per unit weight was set to 5000 F/g. A sheet having a size of 1.5 cm×2.0 cm was cut out from the negative electrode and was used for a negative electrode to be evaluated.

A test cell was assembled in such a manner that a metal lithium plate having a size of 1.5 cm×2.0 cm and a thickness of 200 μm was used as a counter electrode of the negative electrode, with a polyethylene nonwoven fabric having a thickness of 50 μm being interposed as a separator between the counter electrode and the negative electrode. Metal lithium was used as a reference electrode. As an electrolyte used was a solution obtained by dissolving LiPF$_6$ at 1.2 mol/l into a solvent mixture containing ethylene carbonate and diethyl carbonate at the weight ratio of 1:3.

The test cell was charged at constant current of 10 mA till a potential of the negative electrode reached 25 mV. Then, the cell was charged in a constant current—constant voltage charging mode in which a constant voltage of 25 mA was applied to the cell, and the cell was discharged at 1 mA up to 1.5 V. A capacitance of the negative electrode per unit weight was obtained from a discharging time during the potential variation of 0.2 V from the potential of the negative electrode after one minute from the start of discharging. The charging time was controlled so that such a capacity was 5000 F/g, and a charging amount (doping amount of lithium ions) was checked. The doping amount was 400 mAh/g.

(Measurement of Capacitance of Positive Electrode Per Unit Weight)

A sheet having a size of 1.5 cm×2.0 cm was cut out of the positive electrode and was used for a positive electrode to be evaluated. A test cell was assembled in such a manner that a metal lithium plate having a size of 1.5×2.0 cm$^2$ and a thickness of 200 μm was used as a counter electrode of the positive electrode, with a polyethylene nonwoven fabric having a thickness of 50 μm being interposed as a separator between the counter electrode and the positive electrode. Metal lithium was used as a reference electrode. A solution formed by dissolving LiPF$_6$ at 1.2 mol/l in propylene carbonate was used as an electrolyte.

The cell was charged at charging current of 1 mA to 3.6 V, and discharged at constant voltage. After a total charging time of 1 hour, the cell was discharged at 1 mA to 2.5 V. A capacitance of the positive electrode per unit weight was obtained from a discharging time between 3.6 V and 2.5 V, and it was 140 F/g.

(Manufacturing of Film-Type Capacitor Cell)

The positive electrode was cut out into five sheets each having a size of 2.4 cm×3.8 cm. The negative electrode was cut out into six sheets each having a size of 2.5 cm×3.9 cm. The cutout positive electrode and negative electrode sheets were laminated with separators being interposed therebetween, and the resultant was vacuum dried at 150° C. for 12 hours. After it was dried, the separators were located on the uppermost side and lowermost side of the lamination structure, and the four sides of the structure were fastened with a tape, to thereby complete an electrode lamination unit.

Such metal lithium that the doping amount was 400 mA/g for the negative electrode active material weight was press-contacted with a copper expanded metal having a thickness of 23 μm. A sheet of the metal lithium thus press-contacted was located on the outermost side of the electrode lamination unit in a state that it faced the negative electrode. The negative electrodes (five) and the copper expanded metal having the metal lithium foil press-contacted therewith were welded together.

In the electrode lamination unit thus structured, aluminum positive electrode terminals of 3 mm wide×50 mm long×0.1 mm thick having sealed portion that had been heat sealed with sealant films were placed on the terminal welded parts (five sheets) of the positive electrode current collector, and ultrasonic-welded together. Aluminum positive-electrode terminals of 3 mm wide×50 mm long×0.1 mm thick having sealed portion that had been heat sealed with sealant films were placed on the terminal welded parts (six sheets) of the negative current collector, and ultrasonic-welded together. The electrode lamination unit was placed between an outer jacket film deep-drawn to 60 mm (vertical)×30 mm (lateral)×3 mm (deep), and another outer jacket film which is not deep-drawn.

After one side of the terminal part of the outer jacket films and other two sides thereof were heat sealed, the unit was vacuum-impregnated with a solution, the solution formed by dissolving LiPF$_6$ at 1.2 mol/l into a solvent mixture containing ethylene carbonate and diethyl carbonate at the volume ratio of 1:3. Then, the remaining one side of the outer jacket films was heat sealed at reduced pressure and vacuum sealed to assemble three cells of film-type lithium ion capacitors. It was confirmed that the positive electrode active material weight was larger than the negative electrode active material weight.

(Characteristic Evaluation of Cell)

The thus assembled cells were left out for 14 days, and one cell was disassembled. It was confirmed that no metal lithium remained. From this fact, it was considered that the amount of lithium ions, which was necessary for producing a capacitance of 5000 F/g per unit weight of the negative electrode active material, was pre-doped through the charging operation. Thereafter, the positive electrode and the negative electrode of one cell were shortcircuited, and a potential of the positive electrode was measured. The positive electrode potential was within a range from 0.85V to 1.0 V, and from this it was confirmed that the potential was 2.0 V or lower.

The remaining one film-type capacitor cell was charged at constant current of 200 mA till the cell voltage was 3.8 V. Then, it was charged for 30 minutes in a constant current—constant voltage charging mode in which the constant voltage of 3.8 V was applied. Further, the cell was discharged at constant current of 200 mA or 5000 mA till the cell voltage reached 2.2 V. The discharging capacity of 200 mA was treated as a low rate capacity, and the discharging capacity of 5000 mA was treated as a high rate capacity.

The low rate discharging capacity was 16 mAh, and the high rate discharging capacity was 8.5 mAh. A retention ratio of the high rate discharging capacity to the low rate discharging capacity was 53.4%. This value was used as an index for evaluating the rate characteristic.

The cell was charged at constant current of 200 mA for 30 minutes in a constant current—constant voltage charging mode in which the constant voltage of 3.8 V was applied, and a cycle test was conducted 1000 times in which the cell was discharged at constant current of 20 mA till the cell voltage reached 2.2 V. The discharging capacity retention ratio was obtained from a ratio of the discharging capacity of the 1000th cycle to the discharging capacity of the 10th cycle in the cycle test, and it was used as the cycle durability. The cycle durability was 98%.

The energy density at the low rate was 11.8 Wh/L. From this, it was confirmed that the energy density was high.

Examples 2, 3, 4, 5 and 6

Figure 3:
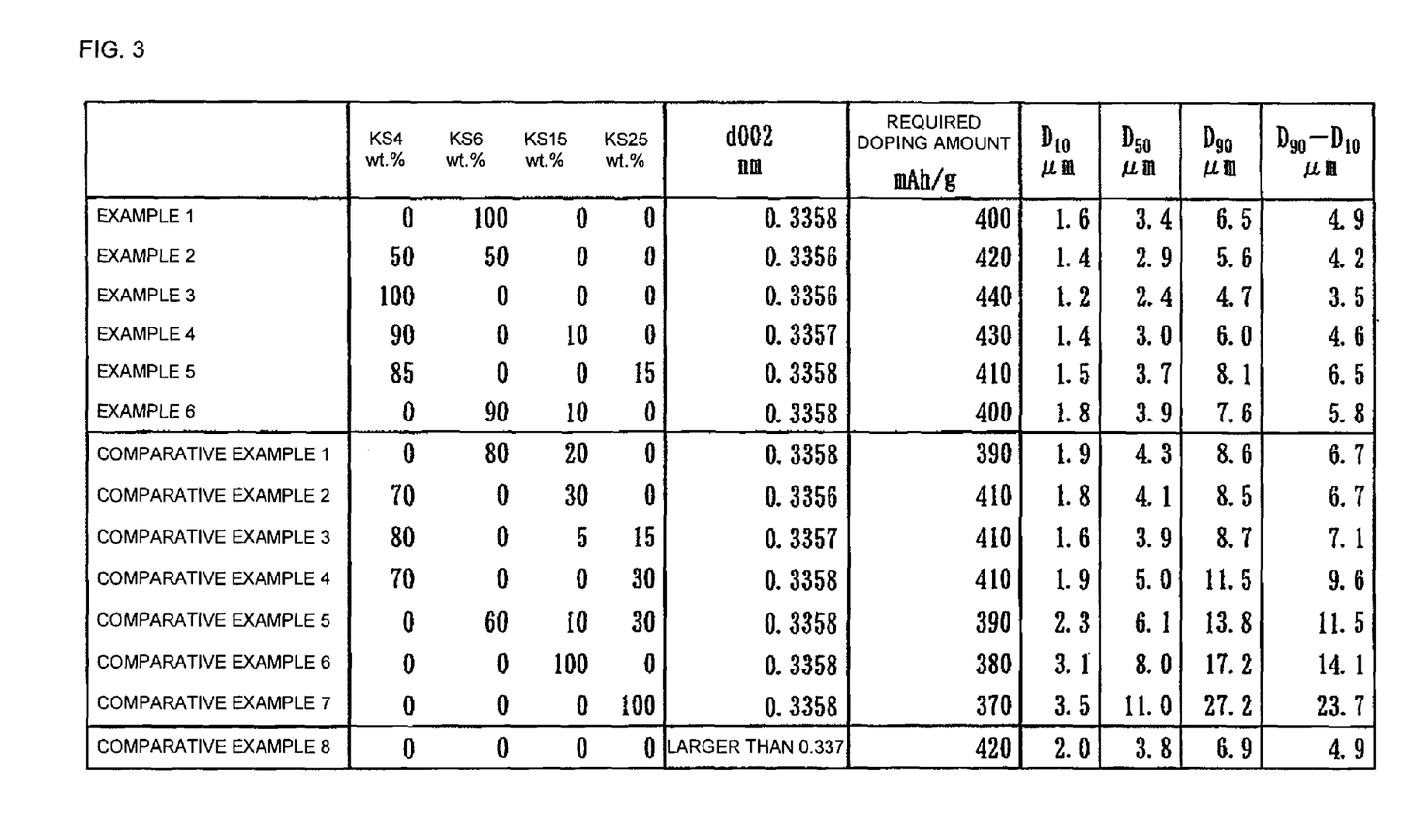
FIG. 3 is a table comparatively showing the details of graphite for a negative electrode active material of the lithium-ion capacitor of the invention and the details of comparative examples.

In Examples 2 to 6, as shown in FIG. 3, one or a mixture of KS4, KS6, KS15, and KS25 (manufactured by TIMCAL Graphite & Carbon) of which an average distance between 002 lattice planes (d002) was within a range from 0.3356 nm to 0.3358 nm, was used for graphite as a negative electrode active material. $D_{50}$ was set to 2.9 μm, 2.4 μm, 3.0 μm, 3.7 μm, 3.9 μm, i.e., smaller than 4.0 μm.

($D_{90}$–$D_{10}$) was set to 4.2 μm, 3.5 μm, 4.6 μm, 6.5 μm, 5.8 μm, i.e., smaller than 7.0 μm. The doping amounts of lithium ions, which are necessary for obtaining a capacitance of 5000 F/g in each negative electrode, as shown in FIG. 3, were adjusted to 420 mAh/g, 440 mAh/g, 430 mAh/g, 410 mAh/g, and 400 mAh/g, respectively. The remaining conditions were similar to those in Example 1.

Comparative Examples 1, 2, 3, 4, 5, 6 and 7

In Comparative Examples 1 to 7, as shown in FIG. 3, one or a mixture of KS4, KS6, KS15, and KS25 (manufactured by TIMCAL Graphite & Carbon) of which an average distance between 002 lattice planes (d002) was within a range from 0.3356 nm to 0.3358 nm, was used for the graphite as the negative electrode active material, as in Examples 1 to 6. $D_{50}$ was set, except Comparative Example 3, to 4.3 μm, 4.1 μm, 5.0 μm, 6.1 μm, 8.0 μm, 11.0 μm, i.e., larger than 4.0 μm. In Comparative Example 3, $D_{50}$ was set to 3.9 μm, smaller than 4.0 μm, and ($D_{90}$–$D_{10}$) was 7.1 μm, larger than 7.0 μm.

Further, ($D_{90}$–$D_{10}$) was set, except Comparative Examples 1 and 2, to 7.1 μm, 9.6 μm, 11.5 μm, 14.1 μm, and 23.7 μm, any of those values being larger than 7.0 μm. In Comparative Examples 1 to 7, the doping amounts of lithium ions, which are necessary for obtaining a capacitance of 5000 F/g in each negative electrode, as shown in FIG. 3, were adjusted to 390 mAh/g, 410 mAh/g, 410 mAh/g, 410 mAh/g, 390 mAh/g, 380 mAh/g, and 370 mAh/g, respectively. The remaining conditions were similar to those in Example 1.

Example 8

Method of Manufacturing Negative Electrode

A phenol resin molding plate of 0.5 mm thick was placed in a Siliconit electric furnace and heat-treated under a nitrogen atmosphere at a rate of 50° C./hour till the temperature reached 550° C., and further heat-treated at a rate of 10° C./hour till the temperature reached 670° C., to thereby synthesize a PAS (an insoluble and infusible base having a polyacene-based skeleton) plate. The PAS plate thus formed was crushed by using a ball mill to produce PAS powder having an average particle size of about 4 μm. An H/C ratio of the PAS powder was 0.2.

88 parts by weight of the PAS powder as the negative electrode active material, 5 parts by weight of acetylene black, 3 parts by weight of a styrene-butadiene rubber binder, 4 parts by weight of carboxymethyl cellulose, and 200 parts by weight of ion exchanged water were sufficiently mixed to obtain a slurry. A current collector was coated with the slurry to form a negative electrode, as in Example 1. Thus, a cell of Example 8 was manufactured in the same manner as in Example 1, except that the negative electrode was manufactured by using the PAS.

X-ray diffraction of the negative electrode active material was measured, and the diffraction peak was considerably broad. An average distance between 002 lattice planes (d002) was larger than 0.337 nm, and this figure clearly shows that the material is not graphite. For the particle size distribution, $D_{10}$=2.0 μm, $D_{50}$=3.8 μm, and $D_{90}$=6.9 μm, and ($D_{90}$–$D_{10}$)=4.9 μm. The charging time was controlled so that 5000 F/g was reached, and the doping amount was adjusted. The result is that 5000 F/g could not be reached, and 670 F/g was reached for the doping amount of 420 mAh/g.

Figure 4:
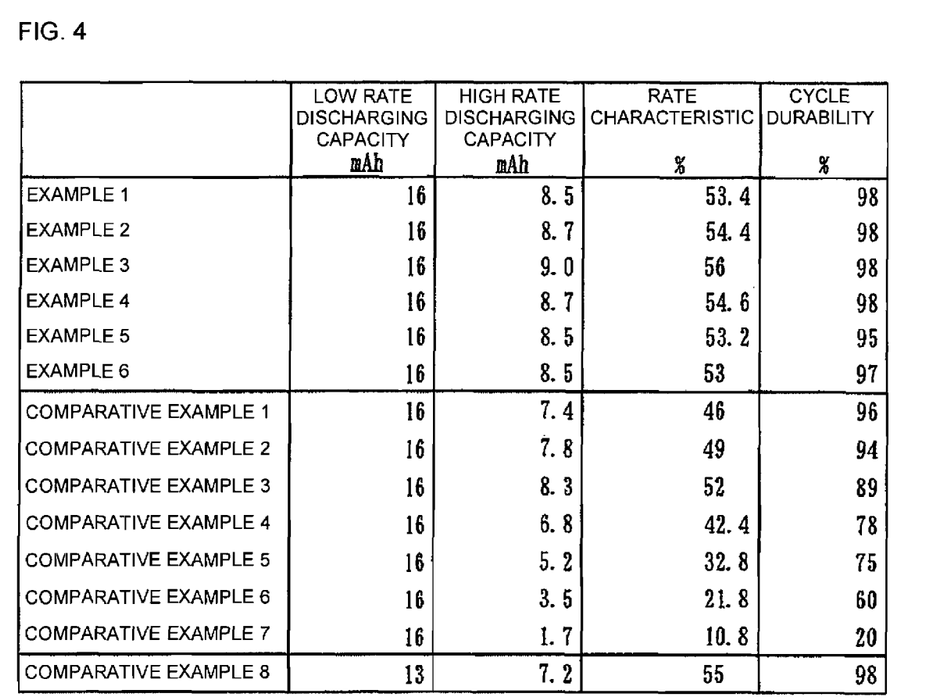
FIG. 4 is a table comparatively showing the results arising from the details of the graphite shown in FIG. 3 for the negative electrode active material of the lithium-ion capacitor of the invention and from the details of comparative examples.

FIG. 4 shows the low rate discharging capacity, the high rated is charging capacity, the rate characteristic, and the cycle durability of the cells of Examples 1 to 6 and Comparative Examples 1 to 8.

As seen from the results shown in FIGS. 3 and 4, when $D_{50}$ is 4.3 μm and 4.1 μm, i.e., larger than 4.0 μm, the rate characteristic lowers to be 46% and 49%, i.e., below 50%, as shown in Comparative Examples 1 and 2. As seen from Examples 1 to 6, when $D_{50} \leq 4.0$ μm as in the case of $D_{50}$=3.9 μm and the like, the rate characteristic is 50% or higher, excellent.

As seen from FIGS. 3 and 4, when $D_{50} \leq 4.0$ μm, the rate characteristic is 50% or higher, excellent. When $D_{50}$>4.0 μm, the rate characteristic is lower than 50%, and bad. From this fact, it is found that to construct a cell having the excellent rate characteristic and high output density, it is essential that $D_{50} \leq 4.0$ μm.

In Comparative Example 3, $D_{50}$=3.9 μm and this figure is smaller than 4.0 μm, and ($D_{90}$–$D_{10}$)=7.1 μm, and this figure is larger than 7.0 μm. In Examples 1 to 6 where ($D_{90}$–$D_{10}$) is 7.0 μm or smaller, and the cycle durability is 90% or higher and good in all of those examples. In Comparative Example 3, the cycle durability is 89%, i.e., below 90%.

In Comparative Examples 4 to 7, $D_{50}$ is larger than 4.0 μm and ($D_{90}$–$D_{10}$) is also larger than 7.0 μm, the rate characteristic lowers to be much smaller than 50%, and the cycle durability also lowers to be much smaller than 90%, as clearly seen from FIG. 4.

FIG. 4 shows that when ($D_{90}$–$D_{10}$)$\leq$7 μm, the cycle durability is 90% or higher and good, and when ($D_{90}$–$D_{10}$)>7 μm, the cycle durability is smaller than 90% and bad. To secure good cycle durability of the cell, it is essential that ($D_{90}$–$D_{10}$)$\leq$7 μm.

Figure 5:
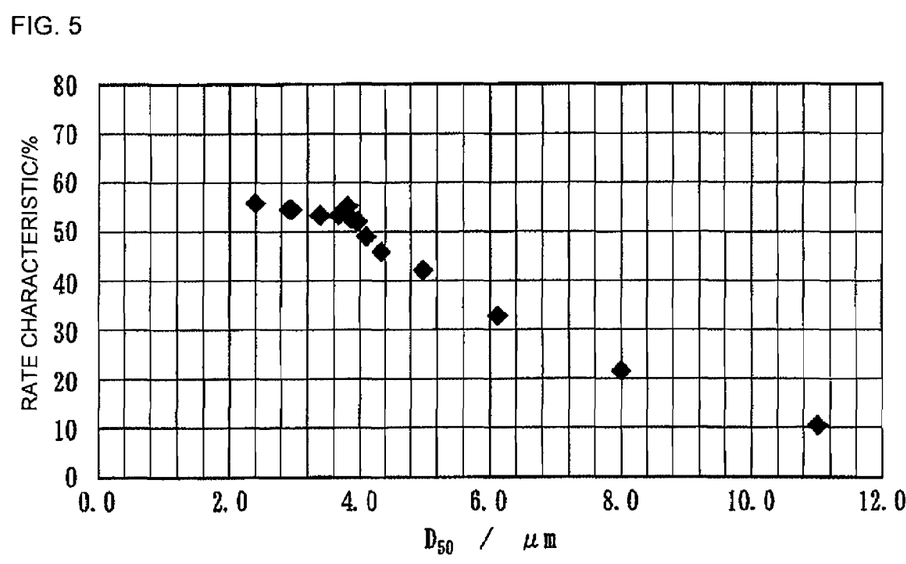
FIG. 5 is a graph showing a variation of rate characteristic with respect to $D_{50}$ in the lithium-ion capacitor using the graphite for the negative electrode active material.
Figure 6:
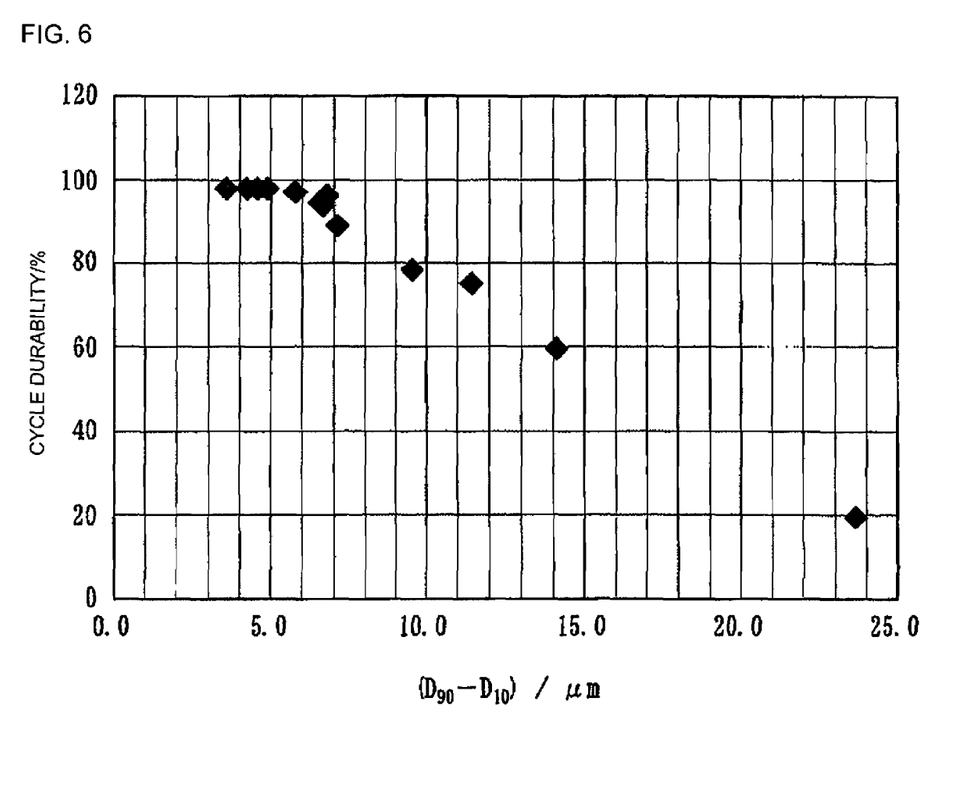
FIG. 6 is a graph showing a variation of cycle durability with respect to $(D_{90}-D_{10})$ in the lithium-ion capacitor using the graphite for the negative electrode active material.

In FIG. 5, a relationship between $D_{50}$ and the rate characteristic is tabulated so as to be readily understood, and in FIG. 6, a relationship between $(D_{90}-D_{10})$ and the cycle durability is tabulated so as to be readily understood.

In Comparative Example 8 using the PAS in place of the graphite, as seen from FIG. 4, the rate characteristic and the cycle durability are good. However, the discharging capacity at the low rate is lower than that of the cell using the graphite for the negative electrode, and the energy density was 9.6 Wh/L. The energy density is higher than that of the general electric double layer capacitor, but is much lower than that of the cell using the graphite for the negative electrode.

In Examples 1 to 6 in which the graphite was used for the negative electrode, and $D_{50}$ and $(D_{90}-D_{10})$ of the particle size were selected to be within specific ranges, the low rate discharging capacity is high, the energy density is high, the rate characteristic is good, and the cycle durability is also satisfactory.

Thus, when the graphite is used for the negative electrode active material, and $D_{50} \leq 4.0\,\mu m$ and $(D_{90}-D_{10}) \leq 7.0\,\mu m$, the resultant lithium-ion capacitor that is high in energy density, output density and cycle durability can be provided.

The results in FIGS. 3 and 4 show that the use of the graphite for the negative electrode active material provides high energy density, the setting of $D_{50}$ to be 4.0 μm or smaller provides high output density, and the setting of $(D_{90}-D_{10})$ to be 7.0 μm or smaller provides high cycle durability.

While the present invention has been described using the embodiment and some specific examples, it should be understood that the invention is not limited to those, but may variously be modified, altered and changed within the true spirits of the invention.

It is believed that the present invention is technically useful in the fields including the lithium-ion capacitor.

What is claimed is:

1. A lithium-ion capacitor comprising a positive electrode, a negative electrode and an electrolyte having an aprotic organic solvent of a lithium salt, wherein a negative electrode active material is graphite defined by the following formula:

$$(D_{90}-D_{10}) \leq 7.0\,\mu m$$

wherein a capacitance of the negative electrode per unit weight is equal to or larger than three times as large as a capacitance of the positive electrode per unit weight, and the weight of the positive electrode active material is larger than that of the negative electrode active material.

2. The lithium-ion capacitor according to claim 1, wherein $D_{50}$ of the graphite is given by $D_{50} \leq 4.0\,\mu m$.

3. The lithium-ion capacitor according to claim 2, wherein the positive electrode active material allows lithium ions and/or anions to be reversibly doped thereinto and de-doped therefrom, the negative electrode active material allows lithium ions to be reversibly doped thereinto and de-doped therefrom, and a potential of the positive electrode when the positive electrode and the negative electrode are shortcircuited is 2 V (vs. Li/Li$^+$) or lower.

4. The lithium-ion capacitor according to claim 1, wherein an average distance between 002 lattice planes of the graphite, as measured by X-ray diffraction, is within a range from 0.335 nm to 0.337 nm.

5. The lithium-ion capacitor according to claim 1, wherein the doping of lithium ions is performed when the negative electrode and/or the positive electrode is electrochemically contacted with a lithium ion source, which is located facing the negative electrode and/or positive electrode.

6. The lithium-ion capacitor according to claim 1, wherein the positive electrode and the negative electrode include current collectors having through holes.

* * * * *